United States Patent
Imbert de Tremiolles et al.

(10) Patent No.: US 6,715,104 B2
(45) Date of Patent: Mar. 30, 2004

(54) MEMORY ACCESS SYSTEM

(75) Inventors: Ghislain Imbert de Tremiolles, St. Paul (FR); Philippe Klein, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 09/682,119

(22) Filed: Jul. 24, 2001

(65) Prior Publication Data

US 2002/0013917 A1 Jan. 31, 2002

(30) Foreign Application Priority Data

Jul. 25, 2000 (EP) .............................. 00480068

(51) Int. Cl.[7] .............................. G06F 11/00
(52) U.S. Cl. .............................. 714/25; 714/5; 714/49; 714/54
(58) Field of Search .............................. 714/25, 49, 54, 714/5, 6

(56) References Cited

U.S. PATENT DOCUMENTS

| | | | | |
|---|---|---|---|---|
| 5,202,979 A | * | 4/1993 | Hillis et al. ............... 714/6 |
| 5,463,755 A | * | 10/1995 | Dumarot et al. ............ 711/148 |
| 5,572,659 A | * | 11/1996 | Iwasa et al. ............... 714/6 |
| 5,740,397 A | * | 4/1998 | Levy ..................... 711/114 |
| 5,758,057 A | * | 5/1998 | Baba et al. ............... 714/7 |
| 5,915,081 A | * | 6/1999 | Yamamoto et al. .......... 714/6 |
| 6,038,680 A | * | 3/2000 | Olarig .................... 714/6 |
| 6,269,453 B1 | * | 7/2001 | Krantz ..................... 714/6 |
| 6,295,591 B1 | * | 9/2001 | Bealkowski et al. ........ 711/165 |
| 6,453,428 B1 | * | 9/2002 | Stephenson ............... 714/6 |
| 6,505,305 B1 | * | 1/2003 | Olarig .................... 714/5 |
| 2001/0042225 A1 | * | 11/2001 | Cepulis et al. ............ 714/25 |
| 2002/0035668 A1 | * | 3/2002 | Nakano et al. ............ 711/114 |

* cited by examiner

*Primary Examiner*—Nadeem Iqbal
*Assistant Examiner*—Yolanda L Wilson
(74) *Attorney, Agent, or Firm*—Ido Tuchman; Derek Jennings

(57) ABSTRACT

A system for accessing a memory organized in memorization subsystems or memory blocks, e.g. standard Dual In-line Memory Modules, wherein the words to be stored are split into unitary elements so that several memorization subsystems are used to store one word and its associated Block Error Code (BEC) bits, is disclosed. The system includes a detector to detect a failure within a memorization subsystem. Insulator that are associated to each memorization subsystem insulate the failed memory block, and a new memorization subsystem is accessed in lieu of the failed one thanks to identification device which determine an available unfailed memory block. The user may replace the failed memory block without shutting down the memory device.

13 Claims, 5 Drawing Sheets

FIG 3

MEMORY ACCESS SYSTEM

BACKGROUND OF INVENTION

1. Field of the Invention

The present invention relates to computer memory systems and more particularly to a memory access system and method which improve the availability of memory systems comprising memorization subsystems and allow a memorization subsystem to be automatically replaced without loosing data and perturbing the computer using such memory systems.

2. Background of the Invention

In today's computers, the memory system is generally made of a plurality of memorization subsystem cards, e.g. Dual In-line Memory Modules (DIMMs). DIMMs are built with several Synchronous Dynamic Random Access Memory (SDRAM) chips, the number of chips depending upon the DIMM memory size, the data bus width, etc. Generally, to store a data in a memorization subsystem card containing several memory chips that can store one byte words, this data is split up into bytes, the first byte is stored in a first memory chip, the second byte in a second memory chip and so on.

These memory chips are subject to different kind of failures:

- soft failures that are intermittent failures due to external noisy environment, like Alpha particles, that disappear if the data word is rewritten at the failing memory location or after a memory reset.
- hard failures that are permanent defects affecting a memory chip, like micro short-circuits, that remain definitively even after memory reset.

These failures, when occurring, may damage the memory system content and then disturb the correct functioning of the current application running on the computer and lead generally to stop this computer in order to replace the failing memorization subsystem card.

To get rid of these failures, Error Correcting Codes (ECC) are generally used to improve the overall memory system failure rate. Indeed, ECC have the capacity to correct automatically errors occurring in a single memory chip without disturbing the functioning of the memory system. To do that, the ECC functions write path function and read path function, that may be located inside the memory controller, are able to detect a failing word and correct it automatically thanks to ECC bits that are stored in additional memory chips on the memorization subsystem card. For example, Single Error Correction (SEC) code can correct one error in a single memory chip, Double Error Correction (DEC) code allows to correct two errors located in the same memory chip, and finally Block Error Code (BEC) code allows to correct all errors in a single memory chip. For instance, the 8-bits Block Error Code, derived from the theory of Bose-Chaudhuri-Hocquenghem codes, is able to correct multiple errors randomly distributed in a memory chip. Using two additional bytes per 64 bits length words, this method allows to correct up to 8 bits in a memory chip that can store one byte length words.

However, as the hard failures are remaining defects, the memorization subsystem cards in which hard failures are localized need to be replaced to maintain a high availability of the memory system, i.e. to avoid memory content damages that happen when errors occur in at least two different chips of a same memorization subsystem card. In this case, the user must turn off the computer and replace the failing memorization subsystem cards. Likewise, upgrading the memory system requires to turn off the computer.

SUMMARY OF INVENTION

It is therefore one of the features of the present invention to provide an improved system for accessing a memory system comprising a plurality of memorization subsystems to increase the availability and the reliability of the computer (s) using such memory system.

It is another feature of the present invention to provide an improved system in which a computer memorization subsystem can be changed without disturbing the computer.

It is still another feature of the present invention to provide an improved system in which a computer memorization subsystem can be automatically replaced without disturbing the computer.

It is still another feature of the present invention to provide a method to copy and to correct the content of a memorization subsystem into another memorization subsystem.

The accomplishment of these and other related features is achieved by a system for accessing a memory device organized in a plurality of memorization subsystems for storing a plurality of data words, each data word being divided into "p" unitary elements. The memory device is adapted to store each of the "p" unitary elements into a different memorization subsystem of the plurality of memorization subsystems. The system includes an identifier for identifying at least one available memorization subsystem among a plurality of memorization subsystems, the available memorization subsystem being unused for storing any unitary elements of the plurality of data words. Further included is an insulator coupled to the plurality of memorization subsystems for individually insulating anyone of the plurality of memorization subsystems and an accessing device coupled to the identifier and to the insulator for accessing the at least one available memorization subsystem in lieu of the insulated anyone of the plurality of memorization subsystems.

The novel features believed to be characteristic of this invention are set forth in the appended claims. The invention itself, however, as well as these and other related objects and advantages thereof, will be best understood by reference to the following detailed description to be read in conjunction with the accompanying drawings.

BRIEF DESCRIPTION OF DRAWINGS

FIG. 3 shows an example of the system behavior when hard failures are detected in memorization subsystems.

DETAILED DESCRIPTION

According to the invention, the words to be stored are split up into sub-words that are stored in different memorization subsystems, independent and removable. Thus, the first sub-word is stored in a first memorization subsystem, the second sub-word is stored in a second memorization subsystem and so on.

The preferred embodiment of the present invention concerns the use of memorization subsystems, e.g. standard DIMMs, referred to as memory cards for sake of clarity, to store 64 bits words. Nevertheless, it is to be understood that the present invention can be put in use with whatever kind of independent and removable memory to store any length words.

Using the present invention to store 64 bits words, ten memory cards containing memory chips able to store r bytes are required. The first eight memory cards are used to store the data bytes while the last two memory cards are used to store the BEC bytes.

Figure 1:
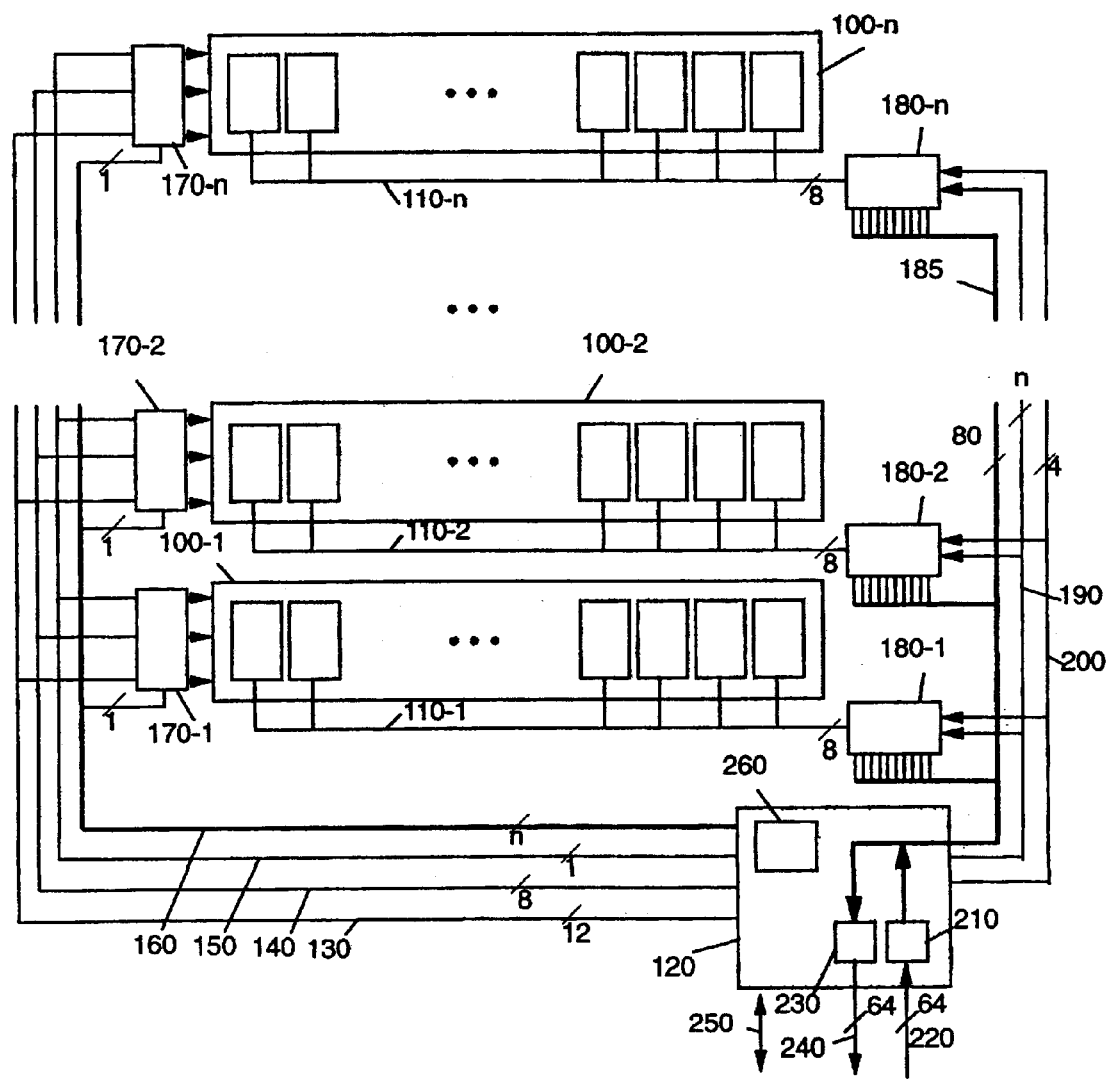
FIG. 1 shows a circuit implementing the present invention.

FIG. 1 shows a circuit implementing the present invention that allows to replace a failing memory card without disturbing the computer. This circuit comprises n memory cards 100-1 to 100-n. The data input/output buses of the memory chips contained within each memory card are connected together to create data input/output buses 110-1 to 110-n that are connected to multiplexor 180-1 to 180-n, controlled by Multiplexor_Select bus 190 and Multiplexor_Position bus 200, to form a global data input/output bus 185 connected to a memory controller 120. The memory controller 120 is also connected to Chip_Select bus 140, address bus 130, power supply bus 150 and Memory_Card_Select bus 160 that are connected to bus-switch components 170-1 to 170-n. Each of these bus-switch component is associated to one memory card to provide or not signals carried by Chip_Select, address and power supply buses depending upon the signal carried by Memory_Card_Select bus. Memory controller 120 contains write path and read path functions (210 and 230 respectively) that are connected to the data input/output bus 185. Write path function is connected to the standard data input bus 220 and read path function is connected to the standard data output bus 240. Memory controller 120 is connected to control bus 250. Buses 250, 240 and 220 are standard buses to connect a memory controller to a computer. Memory controller 120 further comprises a memory card assignment table 260.

To avoid electronic damage, power supply and logical parts of a circuit are generally switched in two steps thus, a sequencer may be used in bus-switches 170-1 to 170-n or these bus-switches may comprise two parts, one concerning the power supply signal and one concerning the logical signals.

Eight memory cards are used to store the eight data bytes of a 64 bits word and two memory cards are used to store its two associated BEC bytes. For instance, the first byte of a word is stored in the first memory location of the first memory chip of a first memory card, the second byte of this word is stored in the first memory location of the first memory chip of a second memory card and so on. The 8 bits input/output of all the memory chips of each memory card are connected together to create busses 110-1 to 110-n in order to make, through multiplexor 180-1 to 180-n, the 80 bits bus 185 that is connected to the memory controller 120 to exchange data between the memory cards and the computer. To set the position of a multiplexor, the multiplexor needs to be selected using Multiplexor_Select bus 190 that comprises n bits, one associated to each multiplexor. As it will be obvious for a person skilled in the art, it is to be understood that the number of wires can be reduced by using an appropriate coding. Then the bus Multiplexor_Position bus 200, comprising 4 bits, is used to set one of its ten possible position (it must be understood that 16 positions are available per multiplexor but only 10 are used in this application). To control the addresses and the enabled chips, the memory controller 120 uses Chip_Select bus 140 and address bus 130. The Chip_Select bus 140 is used to select memory chips inside a memory card thus, if the memory card comprises 8 memory chips, 8 bits are used to enable or disable each of the 8 memory chips. The address bus 130 selects one memory location in all the memory chips selected with Chip_Select. In the implementation presented in FIG. 1 this bus comprises 12 bits because generally 12 multiplexed bits are used to define an address, i.e. to select one row and one column in a memory chip. In order to add or remove a memory card without perturbing the others, each of them needs to be electrically and logically insulated independently. Memory_Card_Select bus 160, connected to the memory controller 120, commands each of the standard bus-switch components 170-1 to 170-n. Thus, this bus comprises n bits at the output of the memory controller 120 and only 1 bit at the input of each bus-switch. Like Multiplexor_Select bus, it will be obvious for a person skilled in the art that the number of wires can be reduced by using an appropriate coding. To detect and correct failing words, write path function 210 and read path function 230, localized in memory controller 120, are used. The read path function 230 is also used to localize a failing memory card and to forewarn the memory controller 120. As mentioned above, errors due to soft failures disappear when the data is rewritten. Thus, a test consisting in rewriting the data may be performed to detect whether the error is a soft failure or a hard failure. If a hard failure is detected, the memory controller 120 automatically insulates this failing memory card using Memory_Card_Select bus 160 so that it is replaced by another unused memory card and the computer user can replace it. When a hard failure occurs, the memory controller 120 sends a message through bus 250 to the computer to inform the user which memory card needs to be replaced. Memory card assignment table 260 is used to set or get the status of each memory card. For example, this table may comprise three columns and as many rows as memory cards in the memory system. Each row represents the status of a memory card, e.g. the first row represents the status of the first memory card, the second row the status of the second memory card and so on. The first column is used to store a free flag representing the use/not use status of the memory card, the second column stores a fail flag defining its fail/not fail status and the last stores the value of the memory block, i.e. a group of ten memory cards able to store words, to which the memory card is associated.

After the memory system has been turned on, the memory controller will initialize the memory card assignment table and assigns ten memory cards to form a first memory block. To initialize this table, all the free flags and fail flags are set to zero. Then, the free flag of the ten first memory cards are set to one and the value of memory block of the first ten memory cards are set to one. The multiplexor associated to the ten first memory cards are set in such a way that the input/output data bus of the first memory card corresponds to the first byte of the input/output data bus 185, the input/output data bus of the second memory card corresponds to the second byte of the input/output data bus 185 and so on.

Figure 2A:
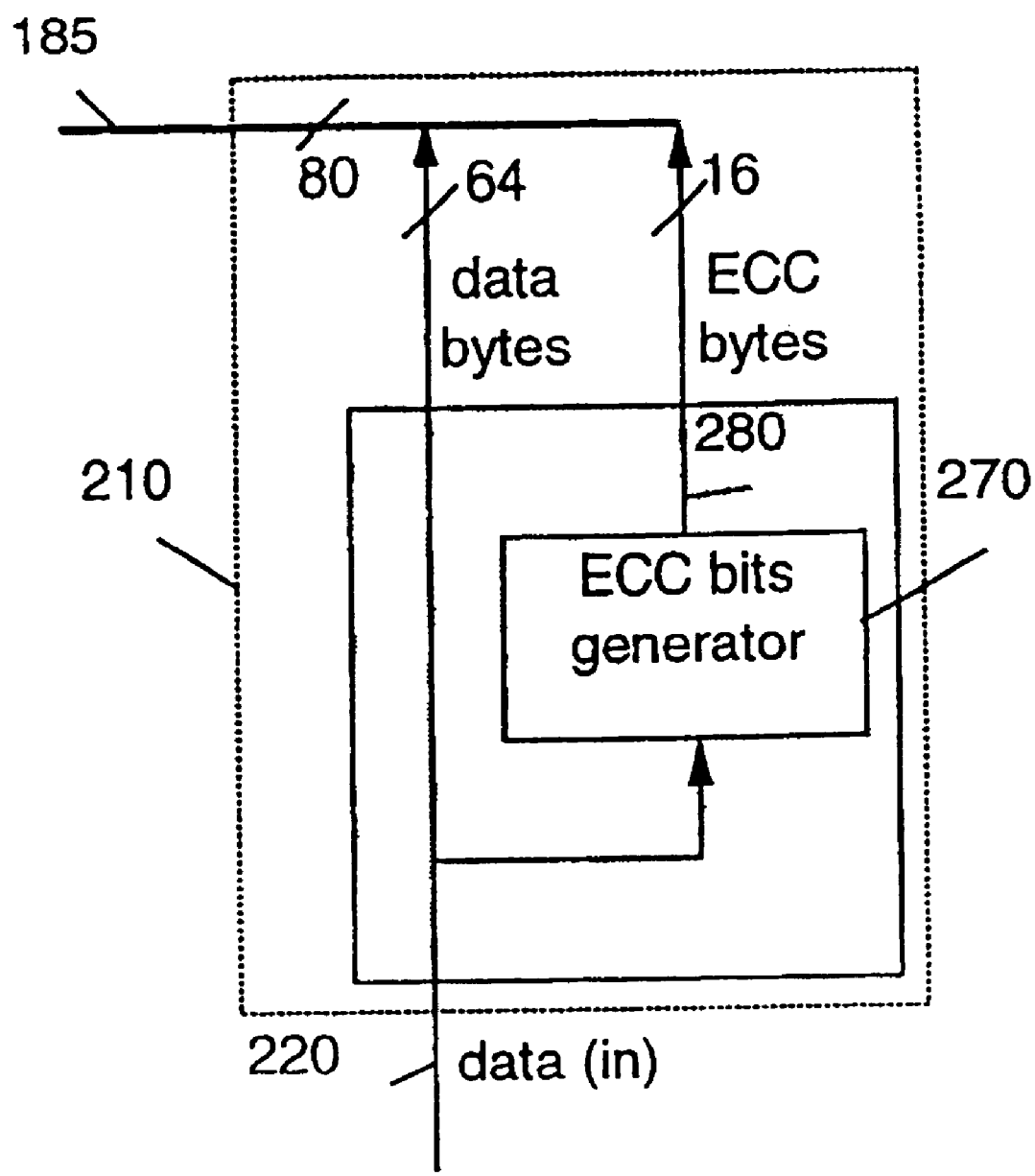
FIG. 2A and FIG. 2B illustrate write and read path macros that are used to detect, localize and correct failing bits.
Figure 2B:
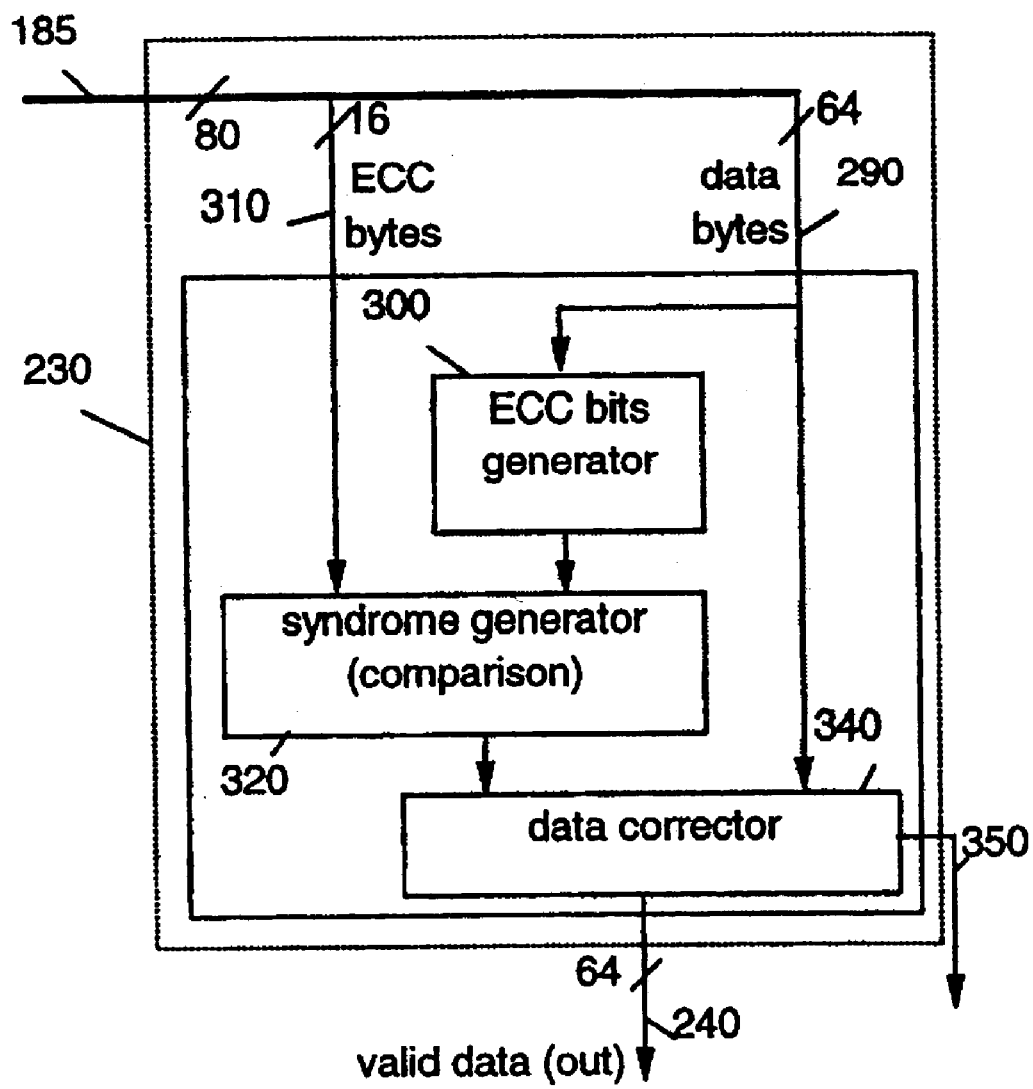

FIGS. 2A and 2B illustrate the circuits of the write path function and read path function respectively.

The write path function contains an ECC bits generator 270 which input is the standard data input bus 220 and output is bus 280 connected to the data input/output bus 185. The standard data input bus 220 is also connected to the data input/output bus 185.

The write path function 210, schematically presented in FIG. 2A, uses the 64 bits of the data transferred from the computer to the data memory through the standard data input bus 220 to compute 16 BEC bits in the ECC bits generator 270 that are stored in the BEC memory thanks to bus 280. Thus, the data and the corresponding ECC are addressed to the memory cards through data input/output bus 185.

The read path function 230 contains an ECC bits generator 300 which the input is connected to the data input/output bus 185 through bus 290 and the output is connected to an input of a syndrome generator 320. The syndrome generator is provided with a second input that is connected to the data input/output bus 185 through bus 310. The read path function 230 also contains a data corrector 340 which an input is connected to the output of the syndrome generator 320 and the second input is connected to the data input/output bus 185 through bus 290. An output of the data corrector is the standard data output bus 240 and the second output is BYTE_in_error bus 350.

To generate a valid data, i.e. a data without error, the read path function 230, schematically presented in FIG. 2B, accesses the data through the standard data input/output bus 185 and bus 290 and re-computes its corresponding BEC bits in the ECC bits generator 300. Then, it compares these evaluated BEC bits with the ones previously stored in the BEC memory and associated to this data, obtained through the standard data input/output bus 185 and bus 310, in the syndrome generator 320. According to the result of this comparison, the data is corrected or not in the data corrector 340. The localization of a failing byte, used to set the position of a multiplexor after a memory card has been replaced, can be obtain through BYTE_in_error bus 350. The 64 bits valid word is obtained on the standard data output bus 240.

When a hard failure is detected in a memory card, the memory controller 120 set its fail flag to one and selects the next free memory card. To find a free memory card, the memory controller examines the memory card assignment table from the beginning and performs a test on the free flag associated to each memory card. The first free memory card is the first one that has been found with its free and fail flags equal to zero. It is to be understood that other method to find a free memory card may be used. In particular, another way consists in using a static circular pointer as known by a person skilled in the art. After having selected the first free memory card, the memory controller 120 sets its free flag to one and its memory block value to the memory block value of the memory card in which the hard failure has been detected. Then, the memory controller set the multiplexor position associated to this selected memory card using the localization obtained through BYTE_in_error bus 350, i.e. in such a way that the bytes that will be stored in this selected memory card correspond to the ones stored in the memory card in which the error has been detected by the read path function 230.

Figure 3:
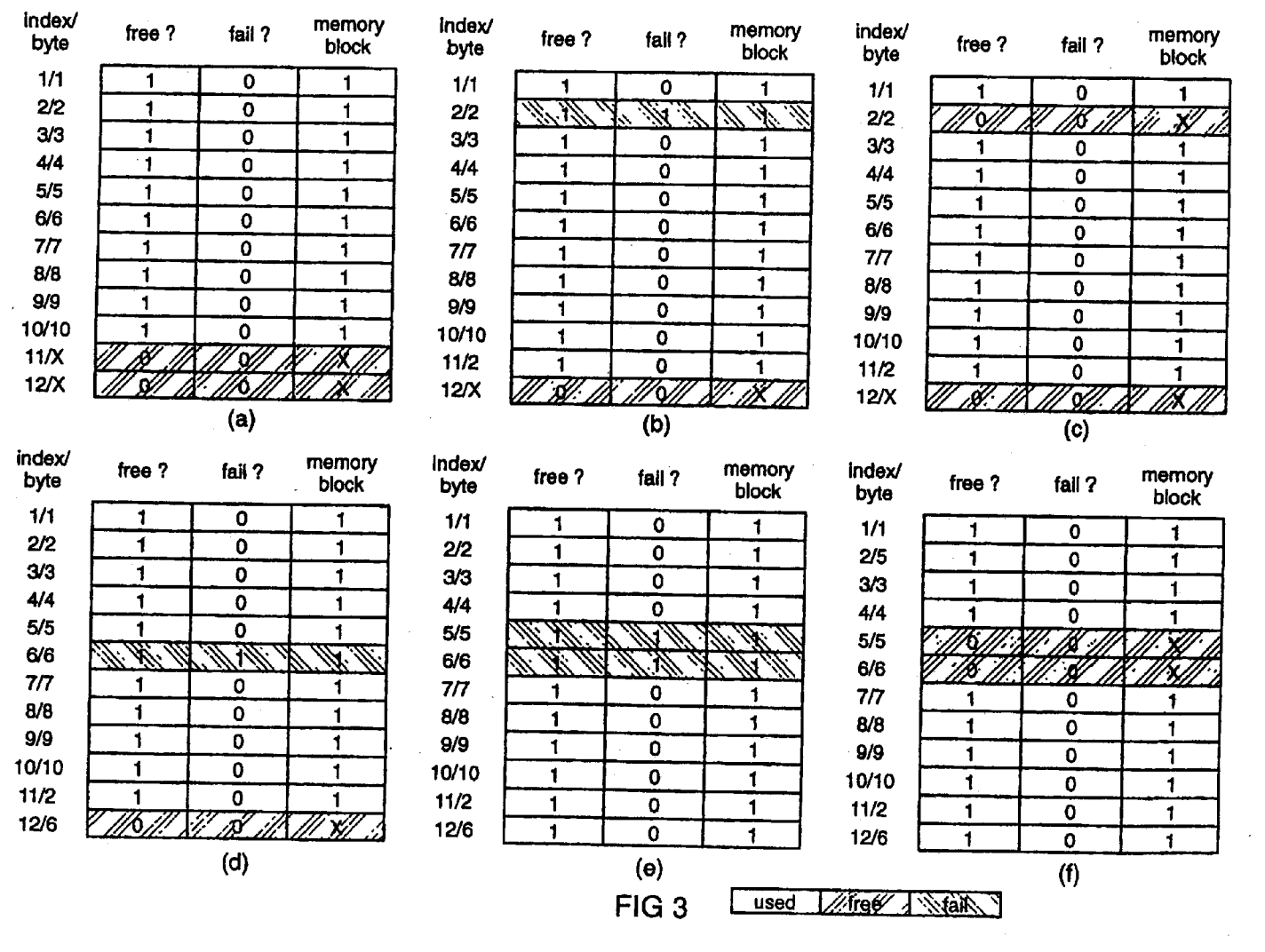

FIG. 3 illustrates an example of the behavior of a memory system comprising 12 memory cards, regarding the memory card assignment table. The values on the left of each table represent the memory card index and the position of the multiplexor associated to the corresponding memory card. The symbol 'X' means any value. After having turned on the memory system, the memory controller initializes the memory card assignment table as explained above. Thus, the free flag of the first ten memory cards and their memory block value are set to one. It is to be noticed that the two last memory card are not used as represented in table (a). Assuming that a hard failure is detected in memory card 2, it is insulated, its fail flag is set to one and the next free memory card, i.e. memory card 11, is activated, its free flag is set to one and its memory block value is also set to one as shown in table (b). The multiplexor associated to memory card 11 is set in such a way that memory card 11 replaces memory card 2. As memory card 2 is insulated, the user may replace it, so memory card 2 may be used, its free and fail flags are set to zero as illustrated in table (c). Assuming that a hard failure is detected in memory card 6, it is replaced by the first free memory card, i.e. memory card 2 as shown in table (d). If a hard failure is detected in memory card 5 before memory card 6 has been replaced, memory card 12 is used to replace memory card 5 as illustrated in table (e). The user may replace the two failing memory cards 5 and 6 so that memory cards 5 and 6 may be used if a new hard failure is detected as presented in table (f).

After having automatically replaced a failing memory card, the memory controller may retrieve the content of the failing memory card and memorize it in the memory card used to replace it.

Figure 4:
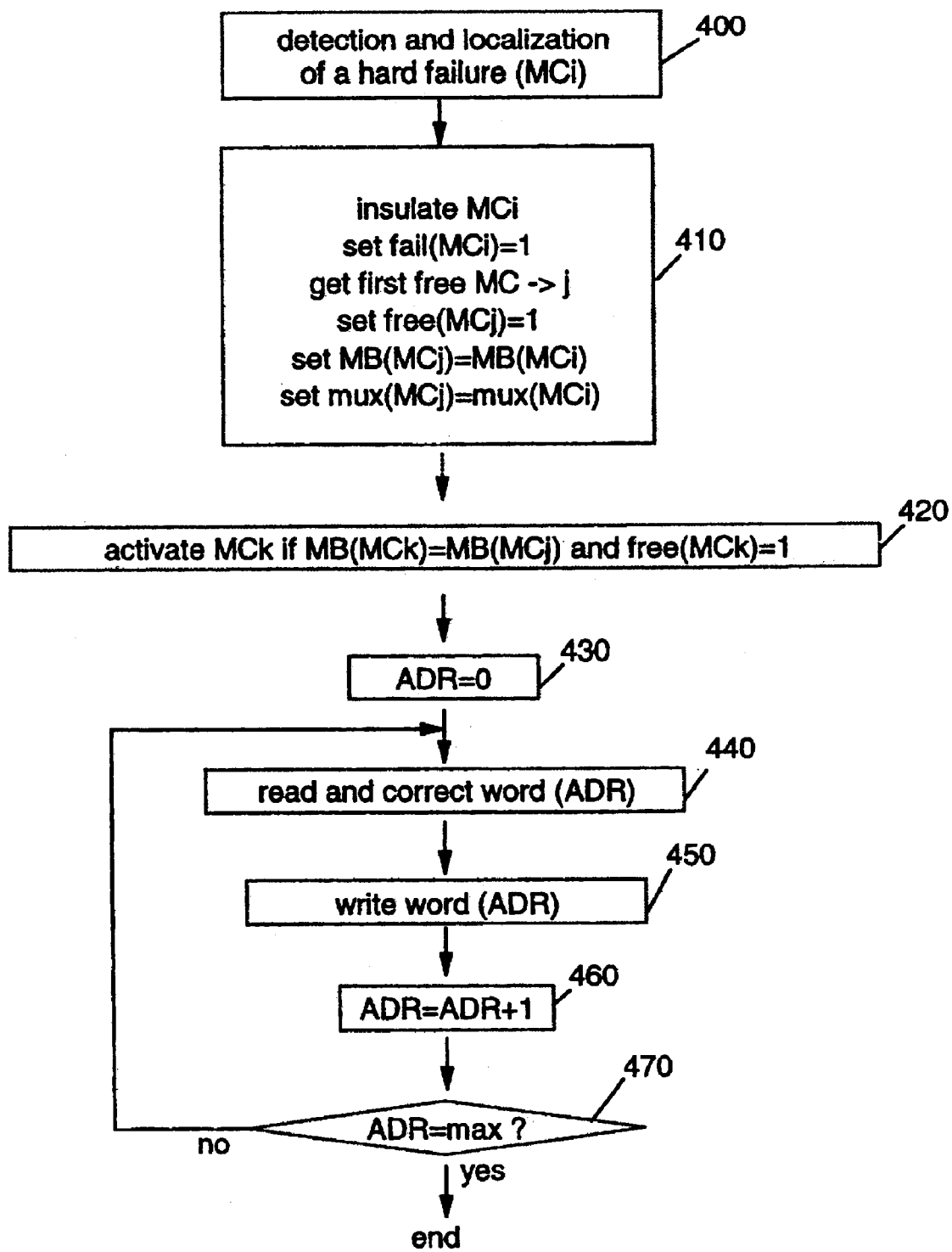
FIG. 4 shows the main steps of the algorithm that illustrates the method of the present invention.

FIG. 4 shows the main steps of the algorithm that illustrates the preferred method of the present invention used in conjunction with the circuit presented in FIG. 1. It represents the procedure used to retrieve the content of a failing memory card, referred to as MCi on the drawing, and to memorize it in a free memory card. After having detected and localized a hard failure in a memory card MCi using read path macro 230 and the data rewriting test (box 400), memory card MCi is replaced by the first free memory card referred to as MCj (box 410). To replace memory card MCi by the first free memory card, the memory controller 120 insulates memory card MCi and set its fail flag to one, then it searches the first free memory card, i.e. MCj, it sets its free flag to one, its memory block value, referred to as MB, to the memory block value of memory card MCi and set the position of its associated multiplexor in such a way that MCj replaces MCi.

Thereafter, all the memory cards belonging to the same memory block as MCj that are not free and not failed are activated (box 420). Then, an address index ADR is set to zero (box 430). For sake of clarity, it is assumed that ADR index is a representation of a memory card address, i.e. an address defined by Chip_Select bus (140) and address bus (130) signals. The word localized at address ADR is read and corrected (box 440). The byte coming from the memory card MCj is not correct, however, as explained above, the coding system allows to retrieve it thanks to ECC. The corrected byte is then written at address ADR in the memory card MCj (box 450). The address ADR is then incremented by 1 (box 460). A test is performed to check if the address ADR is the maximum address that can be used (box 470). If no, a loop is performed to restore the byte located at address ADR in the memory card that has been replaced (box 440 to 470). If ADR has reached its maximum value the process is stopped.

While the invention has been described in term of a preferred embodiment, those skilled in the art will recognize that the invention can be practice with other kind of removable and independent memorization subsystems and for other tasks. In particular, the invention can be useful to upgrade the memory system where the memory cards can be replaced one by one by memory cards having greater capacities or for preventive maintenance, without turning off the computer. In this case, the computer user sends a message to the memory controller that replaces the memory card that must be changed by a free one and inhibits this memory card that must be replaced.

It is to be understood that the present invention is not limited to the embodiment described above, but encompasses any and all embodiments within the scope of the following claims.

What is claimed is:

1. A system for accessing a memory device comprising a plurality of memorization subsystems (100-1 to 100-*n*) for storing a plurality of data words, each data word being divided into 'p' unitary elements, said memory device being adapted to store each of the 'p' unitary elements into a different memorization subsystem of the plurality of memorization subsystems, said system comprising:

an identifier for identifying at least one available memorization subsystem among a plurality of memorization subsystems, said available memorization subsystem being unused for storing any unitary elements of the plurality of data words, the identifier further comprising a detector for detecting a hardware failure in anyone of the plurality of memorization subsystems;

an insulator coupled to the plurality of memorization subsystems for individually insulating anyone of the plurality of memorization subsystems, the insulator insolate a failed memorization subsystem, the insulator comprising an electrical insulator coupled to each of said plurality of memorization subsystems;

a restorer for restoring the content of said insulated memorization subsystem into said available memorization subsystem;

a display screen coupled to said insulator to forewarn a user which of the plurality of memorization subsystems is insulated;

an access device coupled to the identifier and to the insulator for accessing the at least one available memorization subsystem in lieu of said insulated anyone of the plurality of memorization subsystems;

an encoder to encode each of the plurality of data words into 'p=q+m' unitary elements, wherein 'm' is error correction unitary elements; and a decoder responsive to each of said 'q+m' unitary elements for producing an error free 'q' unitary elements data word.

2. The system of claim 1 wherein the identifier further comprising a detector for detecting a hardware failure in anyone of the plurality of memorization subsystems.

3. The system of claim 2 wherein the insulator insulate a failed memorization subsystem.

4. The system according to claim 3 further comprising a restorer for restoring the content of said insulated memorization subsystem into said available memorization subsystem.

5. The system according to claim 4 further comprising an information device coupled to said insulator to forewarn a user which of the plurality of memorization subsystems is insulated.

6. The system according to claim 1 wherein each of said plurality of memorization subsystems is independent and removable.

7. The system of claim 1 wherein said encoder and said decoder use a 8-bits Block Error Coding algorithm.

8. The system according to claim 7 wherein each of said plurality of memorization subsystems is a standard Dual In-line Memory Module.

9. A method for dynamically replacing a failing memorization subsystem of a memory device comprising a plurality of memorization subsystems and an indicator for indicating the status of each of the plurality of memorization subsystems, the method comprising the steps of:

detecting and localizing a hardware failure in at least one memorization subsystem of said plurality of memorization subsystems;

insulating said failed memorization subsystem by setting a flag in said indication means to indicate that said failing memorization subsystem is failed;

selecting at least one available memorization subsystem according to the status of each memorization subsystem;

activating said selected memorization subsystem to replace said failed memorization subsystem;

setting a flag in said indication means to indicate that said selected memorization subsystem is used;

setting an address index to zero;

reading and correcting the content of the memorization subsystem pointed by said address index;

writing said corrected content in the selected available memorization subsystem;

incrementing the address index; and repeating steps 'g to i' until the address index has reached a maximum value.

10. A system for accessing a memory device comprising a plurality of memorization subsystems (100-1 to 100-*n*) for storing a plurality of data words, each data word being divided into 'p' unitary elements, said memory device being adapted to store each of the 'p' unitary elements into a different memorization subsystem of the plurality of memorization subsystems, said system comprising:

an identifier for identifying at least one available memorization subsystem among a plurality of memorization subsystems, said available memorization subsystem being unused for storing any unitary elements of the plurality of data words;

an insulator coupled to the plurality of memorization subsystems for individually insulating anyone of the plurality of memorization subsystems, the insulator comprising an electrical insulator coupled to each of said plurality of memorization subsystems;

an access device coupled to the identifier and to the insulator for accessing the at least one available memorization subsystem in lieu of said insulated anyone of the plurality of memorization subsystems;

an encoder to encode each of the plurality of data words into 'p=q+m' unitary elements, wherein 'm' is error correction unitary elements; and a decoder responsive to each of said 'q+m' unitary elements for producing an error free 'q' unitary elements data word.

11. The system according to claim 10 wherein each of said plurality of memorization subsystems is independent and removable.

12. The system of claim 10 wherein said encoder and said decoder use a 8-bits Block Error Coding algorithm.

13. The system according to claim 10 wherein each of said plurality of memorization subsystems is a standard Dual In-line Memory Module.

* * * * *

UNITED STATES PATENT AND TRADEMARK OFFICE
CERTIFICATE OF CORRECTION

PATENT NO. : 6,715,104 B2
DATED : March 30, 2004
INVENTOR(S) : Tremoilles et al.

It is certified that error appears in the above-identified patent and that said Letters Patent is hereby corrected as shown below:

Column 7,
Line 39, "claim 1" should be -- claim 10--.

Signed and Sealed this

Eighteenth Day of May, 2004

JON W. DUDAS
*Acting Director of the United States Patent and Trademark Office*